United States Patent
Sato et al.

(10) Patent No.: US 10,882,367 B2
(45) Date of Patent: Jan. 5, 2021

(54) AMPHIBIOUS VEHICLE

(71) Applicant: MITSUBISHI HEAVY INDUSTRIES, LTD., Tokyo (JP)

(72) Inventors: Shinichi Sato, Tokyo (JP); Mitsuo Onoue, Tokyo (JP); Tetsuya Miyamoto, Tokyo (JP); Takashi Matsunaga, Tokyo (JP); Katsuhiko Nakajo, Tokyo (JP); Taichi Omura, Tokyo (JP); Yuta Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/470,525

(22) PCT Filed: Dec. 7, 2017

(86) PCT No.: PCT/JP2017/043989
§ 371 (c)(1),
(2) Date: Jun. 17, 2019

(87) PCT Pub. No.: WO2018/116848
PCT Pub. Date: Jun. 28, 2018

(65) Prior Publication Data
US 2019/0322146 A1 Oct. 24, 2019

(30) Foreign Application Priority Data
Dec. 20, 2016 (JP) .................. 2016-247074

(51) Int. Cl.
*B60F 3/00* (2006.01)
*B63H 11/08* (2006.01)
(52) U.S. Cl.
CPC ............ *B60F 3/0007* (2013.01); *B60F 3/003* (2013.01); *B63H 11/08* (2013.01)

(58) Field of Classification Search
CPC ......... B60F 3/0007; B60F 3/003; B63H 11/08
See application file for complete search history.

(56) References Cited

U.S. PATENT DOCUMENTS

| 4,085,697 A | * | 4/1978 | Gaasenbeek | ......... B60F 3/0007 |
|---|---|---|---|---|
| | | | | 180/338 |
| 7,416,457 B2 | * | 8/2008 | Gibbs | ................... B60F 3/0007 |
| | | | | 440/12.52 |

(Continued)

FOREIGN PATENT DOCUMENTS

| CN | 103786540 A | 5/2014 |
|---|---|---|
| JP | 52-76094 U | 6/1977 |

(Continued)

OTHER PUBLICATIONS

International Preliminary Report on Patentability and English translation of the Written Opinion of the International Searching Authority for International Application No. PCT/JP2017/043989, dated Jul. 4, 2019.

(Continued)

*Primary Examiner* — S. Joseph Morano
*Assistant Examiner* — Jovon E Hayes
(74) *Attorney, Agent, or Firm* — Birch, Stewart, Kolasch & Birch, LLP

(57) ABSTRACT

An amphibious vehicle includes a vehicle body, a prime mover, a drive wheel, a water propulsion device, a drive wheel transmission, and a propulsion transmission. The drive wheel is disposed on a front side of the prime mover. The water propulsion device is disposed on a rear side of the prime mover. The drive wheel transmission is disposed on the front side of the prime mover and transmits power from the prime mover to the drive wheel. The propulsion trans- (Continued)

mission is disposed on the rear side of the prime mover and transmits the power from the prime mover to the water propulsion device.

8 Claims, 5 Drawing Sheets

(56) References Cited

U.S. PATENT DOCUMENTS

| | | | |
|---|---|---|---|
| 2003/0153215 A1* | 8/2003 | Gibbs | B60F 3/0007 440/12.51 |
| 2003/0171043 A1* | 9/2003 | Roycroft | B60F 3/0007 440/12.51 |
| 2003/0216090 A1* | 11/2003 | McDowell | B60F 3/0007 440/12.51 |
| 2004/0009841 A1* | 1/2004 | Gibbs | B60F 3/0007 475/198 |
| 2005/0101199 A1* | 5/2005 | Gibbs | B60F 3/0007 440/12.5 |
| 2006/0189224 A1 | 8/2006 | Longdill et al. | |
| 2006/0264127 A1* | 11/2006 | Gibbs | B60L 58/30 440/12.59 |
| 2008/0227344 A1* | 9/2008 | Gaither | B60F 3/0007 440/12.5 |
| 2015/0258867 A1* | 9/2015 | Aoki | B60F 3/0007 440/12.51 |
| 2016/0167469 A1* | 6/2016 | Gibbs | F16H 37/06 74/15.2 |
| 2019/0322146 A1* | 10/2019 | Sato | B60F 3/0069 |

FOREIGN PATENT DOCUMENTS

| | | |
|---|---|---|
| JP | 3-5606 U | 1/1991 |
| JP | 5-26572 U | 4/1993 |
| JP | 2007-503360 A | 2/2007 |
| JP | 2008-516847 A | 5/2008 |
| JP | 4533578 B2 | 9/2010 |
| JP | 4705310 B2 | 6/2011 |
| JP | 2013-136289 A | 7/2013 |
| JP | 2013-166431 A | 8/2013 |
| JP | 2013-180613 A | 9/2013 |
| JP | 2013-199217 A | 10/2013 |
| JP | 2014-108688 A | 6/2014 |
| JP | 2014-108692 A | 6/2014 |
| JP | 2014-109112 A | 6/2014 |
| JP | 2015-96341 A | 5/2015 |
| JP | 2015-129461 A | 7/2015 |
| JP | 2016-505442 A | 2/2016 |

OTHER PUBLICATIONS

International Search Report for International Application No. PCT/JP2017/043989, dated Feb. 27, 2018, with English translation.

* cited by examiner

AMPHIBIOUS VEHICLE

TECHNICAL FIELD

The present invention relates to an amphibious vehicle capable of traveling on land and traveling on water.

Priority is claimed on Japanese Patent Application No. 2016-247074, filed Dec. 20, 2016, the content of which is incorporated herein by reference.

BACKGROUND ART

As an amphibious vehicle, for example, there is an amphibious vehicle described in Patent Literature 1 below. The amphibious vehicle includes a pair of drive wheels, a water propulsion device, an engine, a transmission, and a power distribution device. The pair of drive wheels are disposed on a front side of the engine. The transmission is disposed on a rear side of the engine. The power distribution device is disposed on a rear side of the transmission. The power distribution device distributes power from the transmission between power to the drive wheels and power to the water propulsion device.

CITATION LIST

Patent Literature

[Patent Literature 1]
Published Japanese Translation No. 2016-505442 of the PCT International Publication

SUMMARY OF INVENTION

Technical Problem

For amphibious vehicles, in addition to land traveling stability, water traveling stability is also required.

Thus, an objective of the present invention is to provide an amphibious vehicle in which land traveling stability and water traveling stability can be enhanced.

Solution to Problem

An amphibious vehicle according to one aspect of the present invention for achieving the above objective includes a vehicle body, a prime mover disposed in the vehicle body, a drive wheel disposed on a front side of the prime mover, a water propulsion device disposed on a rear side of the prime mover, a drive wheel transmission disposed on the front side of the prime mover in the vehicle body and configured to transmit power from the prime mover to the drive wheel, and a propulsion transmission disposed on the rear side of the prime mover in the vehicle body and configured to transmit the power from the prime mover to the water propulsion device.

Among the plurality of parts disposed in the vehicle body, the prime mover, the drive wheel transmission, and the propulsion transmission are all heavy weights. Particularly, the prime mover is the heaviest weight among the plurality of parts in the vehicle body. In the amphibious vehicle, the prime mover, which is the heaviest weight, is disposed at a position between the drive wheel transmission and the propulsion transmission in the front-rear direction of the vehicle body. Therefore, the heaviest weight is positioned approximately at a center position in the front-rear direction of the vehicle body. Also, since the drive wheel transmission, which is a heavy weight, is disposed on the front side of the prime mover and the propulsion transmission, which is a heavy weight, is disposed on the rear side of the prime mover, a center of gravity of the amphibious vehicle is also positioned approximately at the center position in the front-rear direction of the vehicle body. Therefore, in the amphibious vehicle, a balance in the front-rear direction of the vehicle body can be maintained.

A turning performance can be enhanced when the vehicle body turns around the heaviest weight among the plurality of parts disposed in the vehicle body compared with a case in which vehicle body turns not centered on the heaviest weight. In addition, in the amphibious vehicle, heavy weights are distributed and disposed on the front side and the rear side with respect to the prime mover which is the heaviest weight. Therefore, in the amphibious vehicle, the turning performance of the vehicle body with respect to the prime mover, which is the heaviest weight, can be enhanced compared to a case in which a plurality of heavy weights are collectively disposed on the front side or the rear side with respect to the prime mover which is the heaviest weight.

Therefore, in the amphibious vehicle, not only land traveling stability but also water traveling stability can be enhanced.

In the amphibious vehicle of the one aspect described above, the prime mover may be disposed in a region including a central position between a front edge of the vehicle body and a rear edge of the vehicle body in the front-rear direction of the vehicle body.

In the amphibious vehicle, while being more balanced in the front-rear direction of the vehicle body, the turning performance of the vehicle body can be further enhanced.

Further, the prime mover may be a gas turbine engine in addition to a reciprocating internal combustion engine such as a diesel engine or a gasoline engine.

In any one of the above amphibious vehicles, the propulsion transmission may include a power distribution unit that distributes the power from the prime mover between power to the drive wheel transmission and power to the water propulsion device, and the amphibious vehicle may further include a first power transmission shaft extending to a rear side from the prime mover and configured to transmit the power of the prime mover to the propulsion transmission, and a second power transmission shaft extending to the front side from the power distribution unit and configured to transmit the power for the drive wheel transmission from the power distribution unit to the drive wheel transmission.

In the amphibious vehicle having the power distribution unit, the second power transmission shaft may pass below the prime mover.

In the amphibious vehicle including the power distribution unit, the prime mover may include an oil pan in which a lubricating oil for reducing friction in a sliding portion in the prime mover is stored, and the second power transmission shaft may penetrate through the oil pan.

In the amphibious vehicle, the second power transmission shaft penetrates through the prime mover, while not passing below the prime mover. In other words, in the amphibious vehicle, the second power transmission shaft is disposed in a region in which the prime mover is present in a height direction of the vehicle body. Therefore, a position of the prime mover, which is the heaviest weight, can be lowered, and the land traveling stability and the water traveling stability can be further enhanced.

The amphibious vehicle of the one aspect described above may further include a first power transmission shaft extending to the rear side from the prime mover and configured to transmit the power of the prime mover to the propulsion transmission, and a second power transmission shaft extending to the front side from the prime mover and configured to transmit the power from the prime mover to the drive wheel transmission.

In the amphibious vehicle, the second power transmission shaft is disposed in a region in which the prime mover is present in a height direction of the vehicle body. Therefore, a position of the prime mover, which is the heaviest weight, can be lowered, and the land traveling stability and the water traveling stability can be further enhanced. Also, in the amphibious vehicle, the power from the prime mover is divided into the power transmitted to the first power transmission shaft connected to the prime mover and the power transmitted to the second power transmission shaft. Therefore, in the amphibious vehicle, a power distribution unit that distributes the power of the prime mover between power to the drive wheel transmission and power to the water propulsion device is unnecessary.

In any of the above-described amphibious vehicles, the vehicle body may include a driver's cab which a driver enters disposed on the front side of the prime mover and above the drive wheel transmission.

In any of the above-described amphibious vehicles, the vehicle body may include a cabin which a passenger enters or a luggage compartment in which a load is introduced disposed on the rear side of the prime mover and above the propulsion transmission.

Advantageous Effects of Invention

According to one aspect of the present invention, land traveling stability and water traveling stability can be enhanced.

DESCRIPTION OF EMBODIMENTS

Hereinafter, various embodiments and modified examples of an amphibious vehicle according to the present invention will be described in detail with reference to the drawings.

First Embodiment

Figure 1:
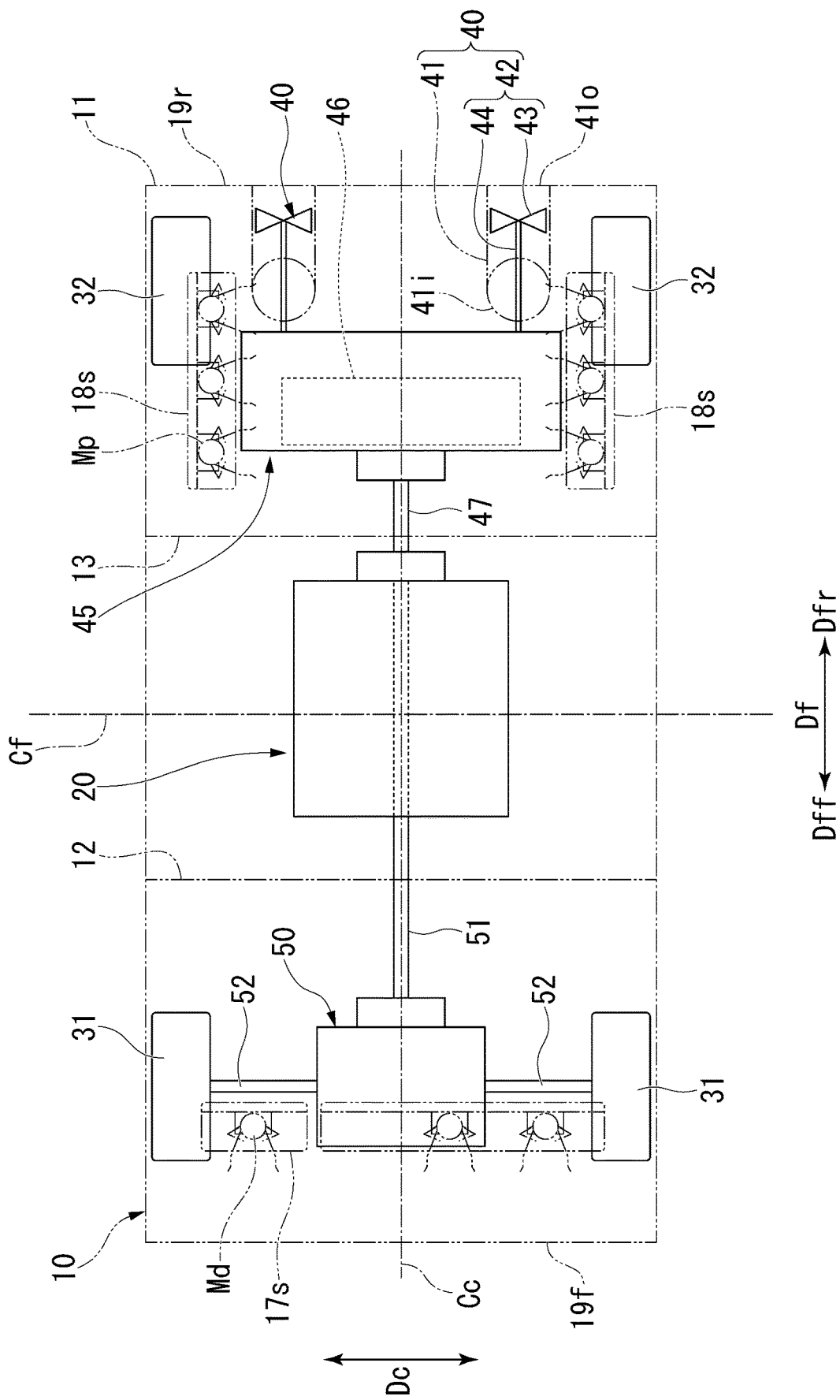
FIG. 1 is a plan view illustrating a disposition of parts in a vehicle body of an amphibious vehicle according to a first embodiment of the present invention.
Figure 2:
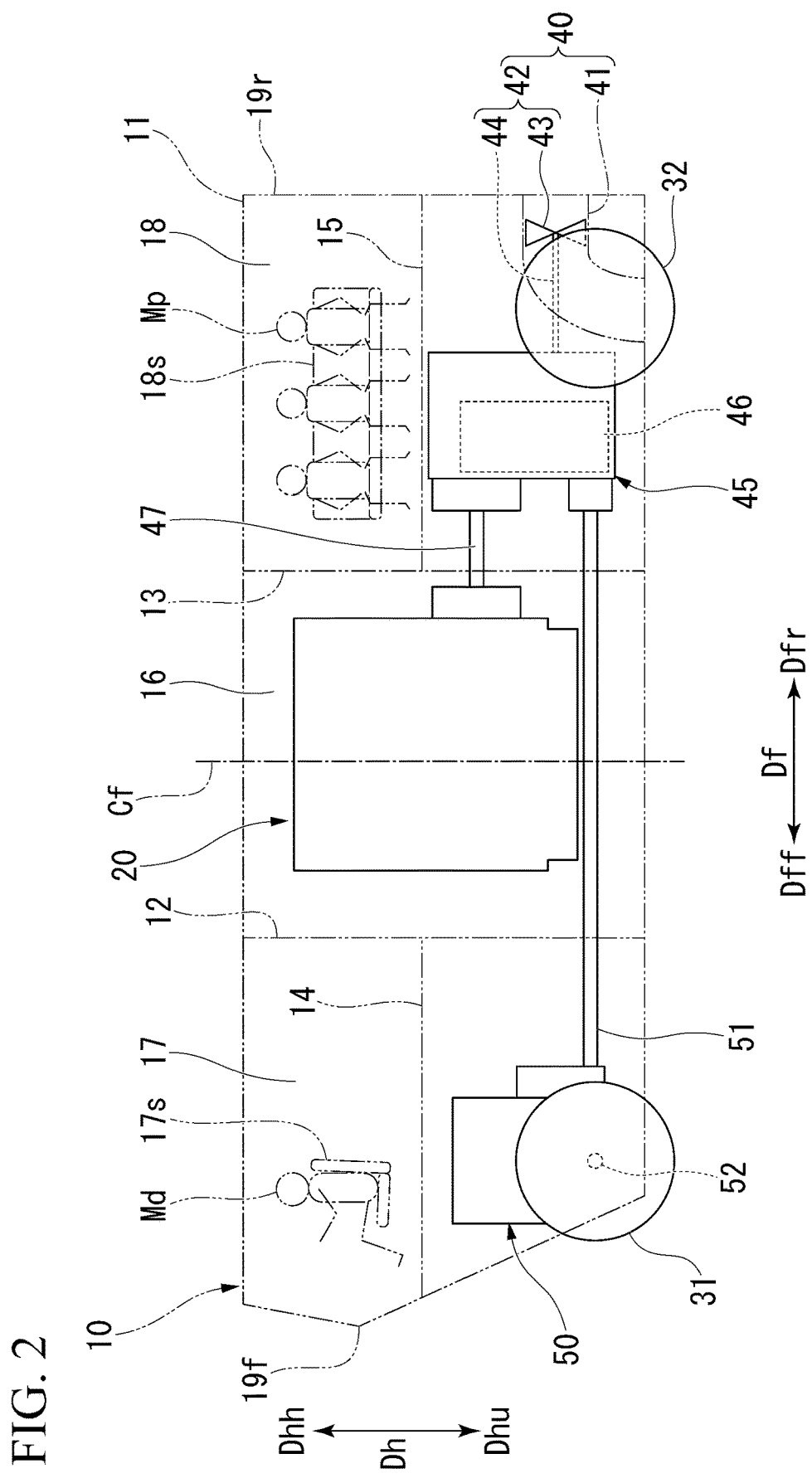
FIG. 2 is a side view illustrating a disposition of parts in the vehicle body of the amphibious vehicle according to the first embodiment of the present invention.

A first embodiment of the amphibious vehicle according to the present invention will be described with reference to FIGS. 1 and 2.

The amphibious vehicle of the present embodiment includes a vehicle body 10, an engine 20, a pair of drive wheels 31, a pair of driven wheels 32, a water propulsion device 40, a propulsion transmission 45, and a drive wheel transmission 50, a first power transmission shaft 47, a second power transmission shaft 51, and a wheel drive shaft 52.

The engine 20 is disposed in a region including a central position Cc in a lateral direction of the vehicle body 10 and in a region including a central position Cf in a front-rear direction Df of the vehicle body 10 between a front edge 19f and a rear edge 19r of the vehicle body 10.

The pair of drive wheels 31 are disposed on a front side Dff of the engine 20 in the front-rear direction Df of the vehicle body 10. The pair of drive wheels 31 are aligned at a distance from each other in a lateral direction Dc of the vehicle body 10. The driven wheels 32 are disposed on a rear side Dfr of the pair of drive wheels 31. The driven wheels 32 are aligned at a distance from each other in the lateral direction Dc of the vehicle body 10. Further, the amphibious vehicle may also include a plurality of pairs of driven wheels 32. Also in this case, each pair of driven wheels 32 are disposed on the rear side Dfr of the pair of drive wheels 31.

The water propulsion device 40 is a device for propelling the vehicle body 10 as a ship on water. The amphibious vehicle of the present embodiment includes a pair of water propulsion devices 40. The water propulsion devices 40 may be, for example, water jet devices. Each of the water jet devices includes a water jet channel 41 and a propeller 42 having an impeller 43 and a propulsion drive shaft 44. The water jet channel 41 includes an intake port 41i formed on a bottom surface of the vehicle body 10 and a jet port 41o formed on a rear surface of the vehicle body 10. The impeller 43 is disposed in the water jet channel 41. The propulsion drive shaft 44 extends in the front-rear direction Df. The impeller 43 is fixed to a rear end of the propulsion drive shaft 44. The impeller 43 is driven by power of the engine 20, takes in water from the intake port 41i and jets the water as a water jet from the jet port 41o when traveling on water. The pair of water propulsion devices 40 is disposed on the rear side Dfr of the engine 20. Also, the pair of water propulsion devices 40 are aligned at a distance from each other in the lateral direction Dc of the vehicle body 10. Further, although the amphibious vehicle of the present embodiment includes a pair of water propulsion devices 40, only one or three or more of the water propulsion devices 40 may be provided. Also, the water propulsion device 40 may be a device having a screw of a general ship.

The propulsion transmission 45 is disposed in a region including the central position Cc in the lateral direction Dc of the vehicle body 10, and in a region on the rear side Dfr of the engine 20 in the vehicle body 10. The first power transmission shaft 47 extends to the rear side Dfr from the engine 20. The propulsion transmission 45 is connected to a rear end of the first power transmission shaft 47. The first power transmission shaft 47 transmits the power from the engine 20 to the propulsion transmission 45. A front end of the propulsion drive shaft 44 of the water propulsion device 40 is connected to the propulsion transmission 45. The propulsion transmission 45 has a function of changing a rotation speed of the first power transmission shaft 47 and transmitting a portion of the power from the first power transmission shaft 47 to the propulsion drive shaft 44. Further, the propulsion transmission 45 includes a power distribution unit 46 which distributes the power from the engine 20 between power to the drive wheel transmission 50 and power to the water propulsion device 40. Thus, the propulsion transmission 45 is also a power distribution device.

The drive wheel transmission 50 is disposed in a region including the central position Cc in the lateral direction Dc of the vehicle body 10 and in substantially the same region as the pair of drive wheels 31 in the front-rear direction Df. Thus, the drive wheel transmission 50 is disposed on the front side Dff of the engine 20 in the vehicle body 10. The second power transmission shaft 51 extends to the front side Dff from the power distribution unit 46. A front end of the second power transmission shaft 51 is connected to the drive wheel transmission 50. The second power transmission shaft 51 is disposed on a lower side Dhu of the engine 20. The second power transmission shaft 51 transmits power from the power distribution unit 46 to the drive wheel transmission 50. The wheel drive shaft 52 extends in the lateral direction Dc from the drive wheel transmission 50. The drive wheels 31 are attached to both ends of the wheel drive shaft 52. The drive wheel transmission 50 has a function of changing a rotation speed of the second power transmission shaft 51 and transmitting the power from the second power transmission shaft 51 to the wheel drive shaft 52.

The vehicle body 10 includes a vehicle body frame 11 constituting an outer frame of the vehicle body 10, a first front-rear partition plate 12, a second front-rear partition plate 13, a first upper-lower partition plate 14, and a second upper-lower partition plate 15. The first front-rear partition plate 12 is disposed on the front side Dff of the engine 20 in the vehicle body frame 11 and partitions the inside of the vehicle body frame 11 into two spaces, namely, front and rear spaces. The second front-rear partition plate 13 is disposed on the rear side Dfr of the engine 20 in the vehicle body frame 11 and partitions the inside of the vehicle body frame 11 into two spaces, namely, front and rear spaces. In the vehicle body frame 11, a space between the first front-rear partition plate 12 and the second front-rear partition plate 13 forms an engine compartment 16. The engine 20 is disposed in the engine compartment 16. The first upper-lower partition plate 14 is disposed in a space on the front side Dff of the first front-rear partition plate 12 in the vehicle body frame 11. The first upper-lower partition plate 14 partitions the space on the front side Dff of the first front-rear partition plates 12 into two spaces, namely, upper and lower spaces in a height direction Dh of the vehicle body in the vehicle body frame 11. Of these two spaces, the space on the upper side Dhh forms a driver's cab 17 which a driver Md enters. A chair 17s on which the driver Md, a driving assistant, and the like sit, and various operation ends for driving are disposed in the driver's cab 17. Also, the drive wheel transmission 50 and the wheel drive shaft 52 are disposed in the space on the lower side Dhu. The second upper-lower partition plate 15 is disposed in the space on the rear side Dfr of the second front-rear partition plate 13 in the vehicle body frame 11. The second upper-lower partition plate 15 partitions the space on the rear side Dfr of the second front-rear partition plate 13 into two spaces, namely, upper and lower spaces in the vehicle body frame 11. Of the two spaces, the space on the upper side Dhh forms a cabin 18 which a plurality of passengers Mp enter. Chairs 18s on which a plurality of passengers Mp sit are disposed in the cabin 18. In the present embodiment, the space forming the cabin 18 may be formed as a luggage compartment into which a load is introduced. Also, the propulsion transmission 45 and the water propulsion device 40 are disposed in the space on the lower side Dhu.

Among the plurality of parts disposed in the vehicle body 10, the engine 20, the drive wheel transmission 50, and the propulsion transmission 45 are all heavy weights. Particularly, the engine 20 is the heaviest weight among the plurality of parts disposed in the vehicle body 10. In the present embodiment, the engine 20, which is the heaviest weight, is disposed at a position between the drive wheel transmission 50 and the propulsion transmission 45 in the front-rear direction Df of the vehicle body 10. Therefore, in the present embodiment, the heaviest weight is positioned approximately at a center position Cf in the front-rear direction Df of the vehicle body 10. Practically, in the present embodiment, the engine 20 is disposed in a region including a central position Cf between the front edge 19f and the rear edge 19r of the vehicle body 10 in the front-rear direction Df of the vehicle body 10. Also, since the drive wheel transmission 50, which is a heavy weight, is disposed on the front side Dff of the engine 20 and the propulsion transmission 45, which is a heavy weight, is disposed on the rear side Dfr of the engine 20, a center of gravity of the amphibious vehicle is also positioned approximately at the center position Cf in the front-rear direction Df of the vehicle body 10. Therefore, in the present embodiment, a balance in the front-rear direction Df of the vehicle body 10 can be maintained. Also, in the present embodiment, all of the engine 20, the drive wheel transmission 50, and the propulsion transmission 45 which are heavy weights are disposed in a region including the central position Cc in the lateral direction Dc of the vehicle body 10. Therefore, in the present embodiment, a balance in the lateral direction Dc of the vehicle body 10 can be maintained.

A turning performance can be enhanced when the vehicle body 10 turns around the heaviest weight among the plurality of parts disposed in the vehicle body 10 compared with a case in which the vehicle body 10 turns not centered on the heaviest weight. In addition, in the present embodiment, the heavy weights are distributed and disposed on the front side Dff and the rear side Dfr with respect to the engine 20 which is the heaviest weight. Therefore, in the present embodiment, the turning performance of the vehicle body 10 with respect to the engine 20, which is the heaviest weight, can be enhanced compared to a case in which a plurality of heavy weights are collectively disposed on the front side Dff or the rear side Dfr with respect to the engine 20 which is the heaviest weight.

Therefore, in the present embodiment, not only land traveling stability but also water traveling stability can be enhanced.

Also, in the present embodiment, as described above, the drive wheel transmission 50 is disposed on the front side Dff of the engine 20, and the propulsion transmission 45 is disposed on the rear side Dfr of the engine 20. Therefore, in the present embodiment, a distance from the engine 20 to the front edge 19f of the vehicle body 10 or a distance from the engine 20 to the rear edge 19r of the vehicle body 10 can be shortened compared to a case in which the drive wheel transmission 50 and the propulsion transmission 45 are disposed collectively on the front side Dff or the rear side Dfr of the engine 20.

In the present embodiment, the second power transmission shaft 51 is disposed on the lower side Dhu of the engine 20. In the present embodiment, in addition, the power distribution unit 46 of the propulsion transmission 45 disposed on the rear side Dfr of the engine 20 and the drive wheel transmission 50 disposed on the front side Dff of the engine 20 are connected by the second power transmission shaft 51. However, the power distribution unit 46 of the propulsion transmission 45 and the drive wheel transmission 50 may also be connected by the second power transmission shaft 51 with the second power transmission shaft 51 disposed on the left side or right side with respect to the engine 20.

Modified Example

Figure 3:
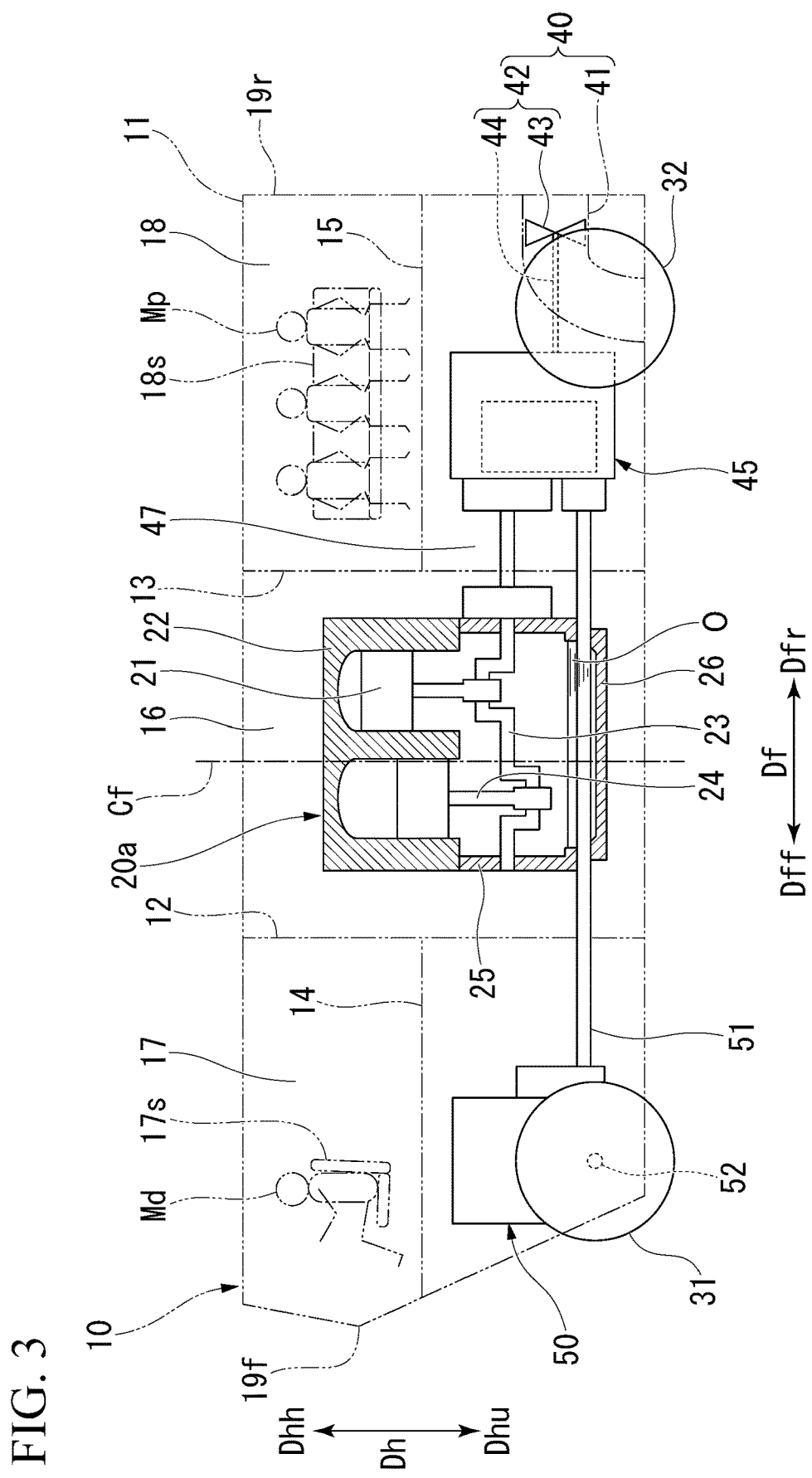
FIG. 3 is a side view illustrating a disposition of parts in the vehicle body of the amphibious vehicle according to a modified example of the first embodiment of the present invention.

A modified example of the first embodiment of the amphibious vehicle according to the present invention will be described with reference to FIG. 3.

In the amphibious vehicle of the above-described first embodiment, since the second power transmission shaft 51 is disposed on the lower side Dhu of the engine 20, the power distribution unit 46 of the propulsion transmission 45 disposed on the rear side Dfr of the engine 20 and the drive wheel transmission 50 disposed on the front side Dff of the engine 20 are connected by the second power transmission shaft 51. However, the second power transmission shaft 51 may penetrate through an engine 20a.

The engine 20a of the present modified example includes a piston 21 that moves back and forth, a cylinder 22 in which the piston 21 is disposed, a crankshaft 23, a connecting rod 24, a crankcase 25, and an oil pan 26. The crankshaft 23 is disposed on the lower side Dhu of the piston 21. The connecting rod 24 connects the piston 21 and the crankshaft 23. The crankcase 25 accommodates the crankshaft 23. The crankcase 25 is fixed to the lower side Dhu of the cylinder 22. The oil pan 26 stores lubricating oil O which reduces friction between the cylinder 22 and the piston 21. A sliding portion of the engine 20a includes between the cylinder 22 and the piston 21. The oil pan 26 is fixed to the lower side Dhu of the crankcase 25. Further, the lubricating oil O serves the role of cooling the piston 21 and the cylinder 22 and also the role of washing them. A prime mover of the amphibious vehicle is often an engine of the type illustrated in the present modified example, and the prime mover of the first embodiment described above and a prime mover of the second embodiment to be described below are also engines of this type.

In the present modified example, the second power transmission shaft 51 penetrates through the oil pan 26 of the engine 20a. An oil seal is provided at a portion of the oil pan 26 through which the second power transmission shaft 51 penetrates.

In the present modified example, when a position of the second power transmission shaft 51 in the height direction Dh with respect to the vehicle body 10 is the same as that in the first embodiment, an uppermost position of the engine 20a can be lower than that in the first embodiment. Therefore, in the present modified example, a center of gravity of the heaviest weight can be lowered, and the land traveling stability and the water traveling stability can be further enhanced.

Second Embodiment

Figure 4:
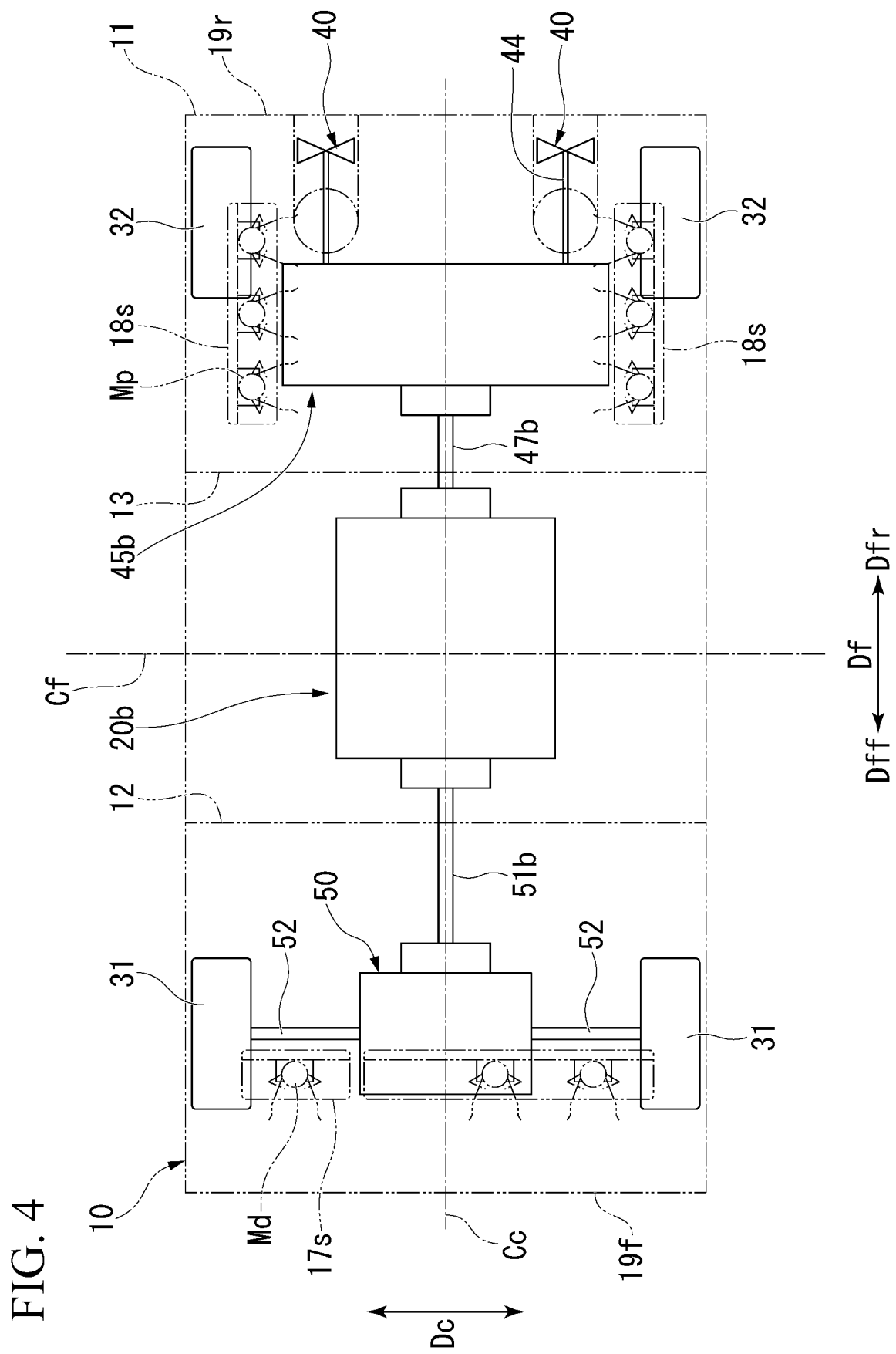
FIG. 4 is a plan view illustrating a disposition of parts in a vehicle body of an amphibious vehicle according to a second embodiment of the present invention.
Figure 5:
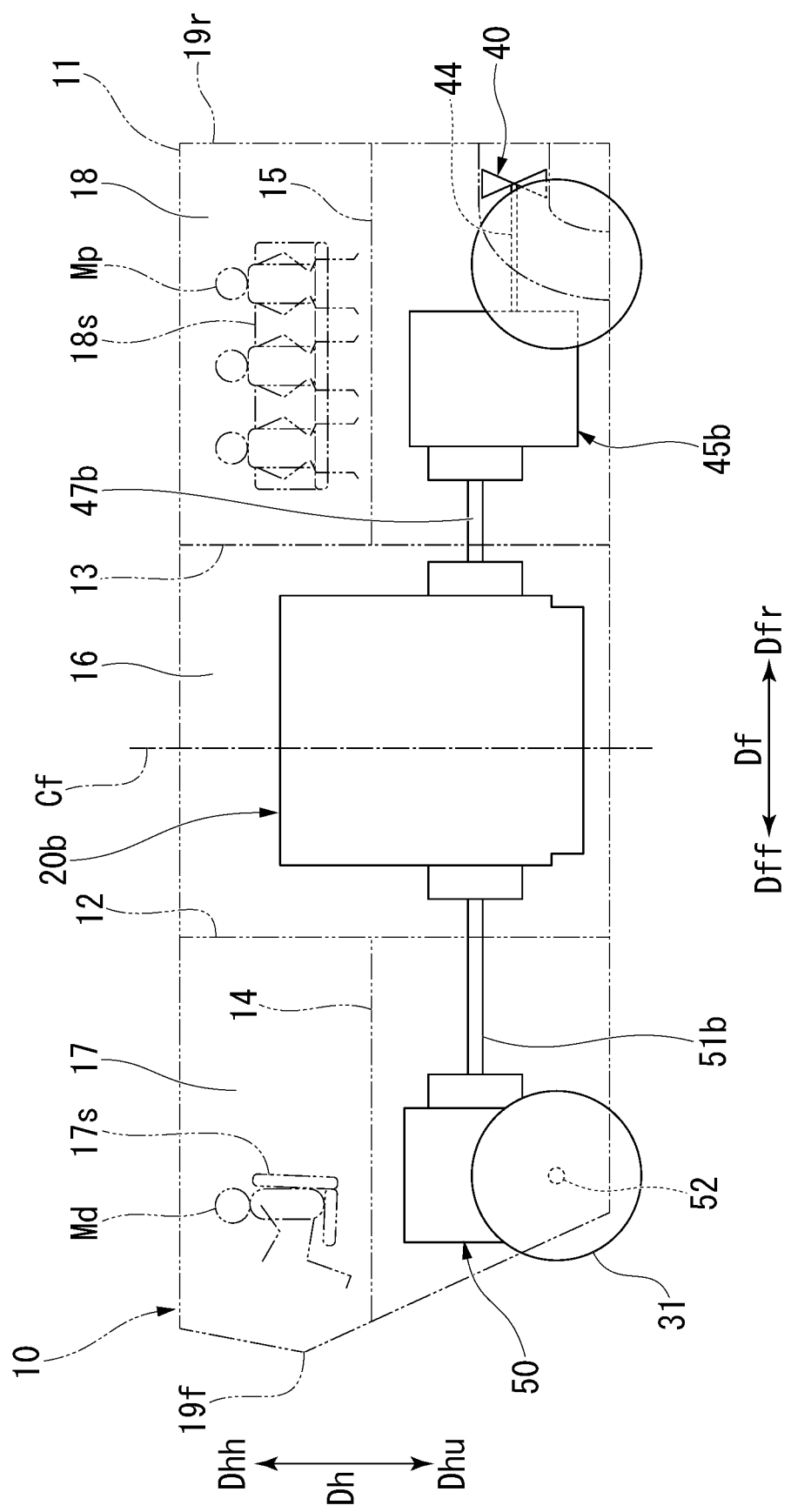
FIG. 5 is a side view illustrating a disposition of parts in the vehicle body of the amphibious vehicle according to the second embodiment of the present invention.

A second embodiment of an amphibious vehicle according to the present invention will be described with reference to FIGS. 4 and 5.

As in the amphibious vehicle of the first embodiment, the amphibious vehicle of the present embodiment also includes a vehicle body 10, an engine 20b, a pair of drive wheels 31, driven wheels 32, a water propulsion device 40, a drive wheel transmission 50, a propulsion transmission 45b, a first power transmission shaft 47b, a second power transmission shaft 51b, and a wheel drive shaft 52.

As in the first embodiment, the engine 20b is disposed in a region including a central position Cc in a lateral direction of the vehicle body 10 and in a region including a central position Cf between a front edge 19f and a rear edge 19r of the vehicle body 10 in a front-rear direction Df of the vehicle body 10.

The pair of drive wheels 31 are disposed on a front side Dff of the engine 20b in the front-rear direction Df of the vehicle body 10, as in the first embodiment. The water propulsion device 40 is disposed on a rear side Dfr of the engine 20b as in the first embodiment.

As in the first embodiment, the propulsion transmission 45b is disposed in a region including the central position Cc in a lateral direction Dc of the vehicle body 10 and in a region on the rear side Dfr of the engine 20b in the vehicle body 10. The first power transmission shaft 47b extends from the engine 20b to the rear side Dfr. The propulsion transmission 45b is connected to a rear end of the first power transmission shaft 47b. A front end of the propulsion drive shaft 44 of the water propulsion device 40 is connected to the propulsion transmission 45b. The propulsion transmission 45b of the present embodiment has a function of changing a rotation speed of the first power transmission shaft 47b and transmitting power from the first power transmission shaft 47b to the propulsion drive shaft 44 but does not have the power distribution unit 46 of the propulsion transmission 45 in the first embodiment.

As in the first embodiment, the drive wheel transmission 50 is disposed in a region including the central position Cc in the lateral direction Dc of the vehicle body 10 and in substantially the same region as the pair of drive wheels 31 in the front-rear direction Df. The second power transmission shaft 51b of the present embodiment extends from the engine 20b to the front side Dff. The front end of the second power transmission shaft 51b is connected to the drive wheel transmission 50. Thus, the second power transmission shaft 51b of the present embodiment is disposed in a region in which the engine 20b is present in a height direction Dh. The second power transmission shaft 51b transmits power from the engine 20b to the drive wheel transmission 50. The wheel drive shaft 52 extends in the lateral direction Dc from the drive wheel transmission 50. The drive wheels 31 are attached to both ends of the wheel drive shaft 52. The drive wheel transmission 50 has a function of changing a rotation speed of the second power transmission shaft 51b and transmitting the power from the second power transmission shaft 51b to the wheel drive shaft 52.

The first power transmission shaft 47b described above is mechanically connected to a first end of an output shaft of the engine 20b so that it is rotated according to rotation of the output shaft of the engine 20b. Also, the second power transmission shaft 51b described above is mechanically connected to a second end of the output shaft of the engine 20b so that it is rotated according to the rotation of the output shaft of the engine 20b.

Also in the present embodiment, as in the first embodiment, the engine 20b, which is the heaviest weight, is disposed at a position between the drive wheel transmission 50 and the propulsion transmission 45b in the front-rear direction Df of the vehicle body 10. Therefore, also in the present embodiment, as in the first embodiment, a balance in the front-rear direction Df can be maintained, and turning performance of the vehicle body 10 can be enhanced.

Also, in the present embodiment, the second power transmission shaft 51b is disposed in a region in which the engine 20b is present in the height direction Dh. Therefore, in the present embodiment, a position of the engine 20b, which is the heaviest weight, can be lowered, and the land traveling stability and the water traveling stability can be further enhanced.

Also, in the present embodiment, the power from the engine 20b is divided into the power transmitted to the first power transmission shaft 47b connected to the engine 20b and the power transmitted to the second power transmission shaft 51b. Therefore, in the present embodiment, a power distribution unit that distributes the power of the engine 20b between power to the drive wheel transmission 50 and power to the water propulsion device 40 is unnecessary. Therefore, in the present embodiment, the size of the propulsion transmission 45b can be made smaller than that of the first embodiment, and a structure of the propulsion transmission 45b can be simplified and manufacturing costs can be reduced.

Further, although the prime mover of the first embodiment and the present embodiment may be an engine of the type illustrated by the present modified example of the first embodiment, an engine of another type may also be used. The prime mover of the first embodiment and the present embodiment may be, for example, a gas turbine engine.

INDUSTRIAL APPLICABILITY

According to one aspect of the present invention, land traveling stability and water traveling stability can be enhanced.

REFERENCE SIGNS LIST

10 Vehicle body
11 Vehicle body frame
12 First front-rear partition plate
13 Second front-rear partition plate
14 First upper-lower partition plate
15 Second upper-lower partition plate
16 Engine compartment
17 Driver's cab
17s Chair
18 Cabin
18s Chair
19f Front edge
19r Rear edge
20, 20a, 20b Engine (Prime mover)
21 Piston
22 Cylinder
23 Crankshaft
24 Connecting rod
25 Crankcase
26 Oil pan
31 Drive wheel
32 Driven wheel
40 Water propulsion device
41 Water jet channel
41i Intake port
41o Jet port
42 Propeller
43 Impeller
44 Propulsion drive shaft
45, 45b Propulsion transmission
46 Power distribution unit
47, 47b First power transmission shaft
50 Drive wheel transmission
51, 51b Second power transmission shaft
52 Wheel drive shaft
Cc Central position in lateral direction
Cf Central position in front-rear direction
Df Front-rear direction
Dff Front side
Dfr Rear side
Dc Lateral direction
Dh Height direction
Dhh Upper side
DHu Lower side
Md Driver
Mp Passenger
O Lubricating oil

The invention claimed is:

1. An amphibious vehicle, comprising:
a vehicle body:
a prime mover disposed in the vehicle body;
a drive wheel disposed on a front side of the prime mover;
a water propulsion device disposed on a rear side of the prime mover;
a drive wheel transmission disposed on the front side of the prime mover in the vehicle body and configured to transmit power from the prime mover to the drive wheel; and
a propulsion transmission disposed on the rear side of the prime mover in the vehicle body and configured to transmit the power from the prime mover to the water propulsion device,
wherein the propulsion transmission includes a power distribution unit that distributes the power from the prime mover between power to the drive wheel transmission and power to the water propulsion device, the amphibious vehicle further comprising:
a first power transmission shaft extending to a rear side from the prime mover and configured to transmit the power of the mime mover to the propulsion transmission, and
a second power transmission shaft extending to the front side from the power distribution unit and configured to transmit power for the drive wheel transmission from the power distribution unit to the drive wheel transmission,
wherein the first power transmission shaft and the second power transmission shaft are disposed at a central position in a lateral direction of the vehicle body.

2. The amphibious vehicle according to claim 1, wherein the prime mover is disposed in a region including a central position between a front edge of the vehicle body and a rear edge of the vehicle body in the front-rear direction of the vehicle body.

3. The amphibious vehicle according to claim 1, wherein the second power transmission shaft passes below the prime mover.

4. The amphibious vehicle according to claim 1, wherein the prime mover includes an oil pan in which a lubricating oil for reducing friction in a sliding portion in the prime mover is stored, and
the second power transmission shaft penetrates through the oil pan.

5. An amphibious vehicle comprising: vehicle body: prime mover disposed in the vehicle body; drive wheel disposed on a front side of the prime mover; a water propulsion device disposed on a rear side of the prime mover; a drive wheel transmission disposed on the front side of the prime mover in the vehicle body and configured to transmit power from the prime mover to the drive wheel; a propulsion transmission disposed on the rear side of the prime mover in the vehicle a first power transmission shaft extending to the rear side from the prime mover and configured to transmit the power of the prime mover to the propulsion transmission; and a second power transmission shaft extending to the front side from the prime mover and configured to transmit the power from the prime mover to the drive wheel transmission, wherein the first power transmission shaft and the second power transmission shaft are disposed at central position in a lateral direction of the vehicle body.

6. The amphibious vehicle according to claim 1, wherein the vehicle body includes a driver's cab which a driver enters disposed on the front side of the prime mover and above the drive wheel transmission.

7. The amphibious vehicle according to claim 1, wherein the vehicle body includes a cabin which a passenger enters or a luggage compartment in which a load is introduced disposed on the rear side of the prime mover and above the propulsion transmission.

8. An amphibious vehicle, comprising:
a vehicle body;
a prime mover disposed in the vehicle body;
a drive wheel disposed on a front side of the prime mover;
a water propulsion device disposed on a rear side of the prime mover;
a drive wheel transmission disposed on the front side of the prime mover in the vehicle body and configured to transmit power from the prime mover to the drive wheel; and a propulsion transmission disposed on the rear side of the prime mover in the vehicle body and configured to transmit the power from the prime mover to the water propulsion device, wherein the propulsion transmission includes a power distribution unit that distributes the power from the prime mover between power to the drive wheel transmission and power to the water propulsion device, the amphibious vehicle further comprising:

a first power transmission shaft extending to a rear side from the prime mover and configured to transmit the power of the prime mover to the propulsion transmission; and a second power transmission shaft extending to the front side from the power distribution unit and configured to transmit power for the drive wheel transmission from the power distribution unit to the drive wheel transmission, and wherein the prime mover includes an oil pan in which a lubricating oil for reducing friction in a sliding portion in the prime mover is stored, and the second power transmission shaft penetrates through the oil pan.

* * * * *